Patented Sept. 12, 1922.

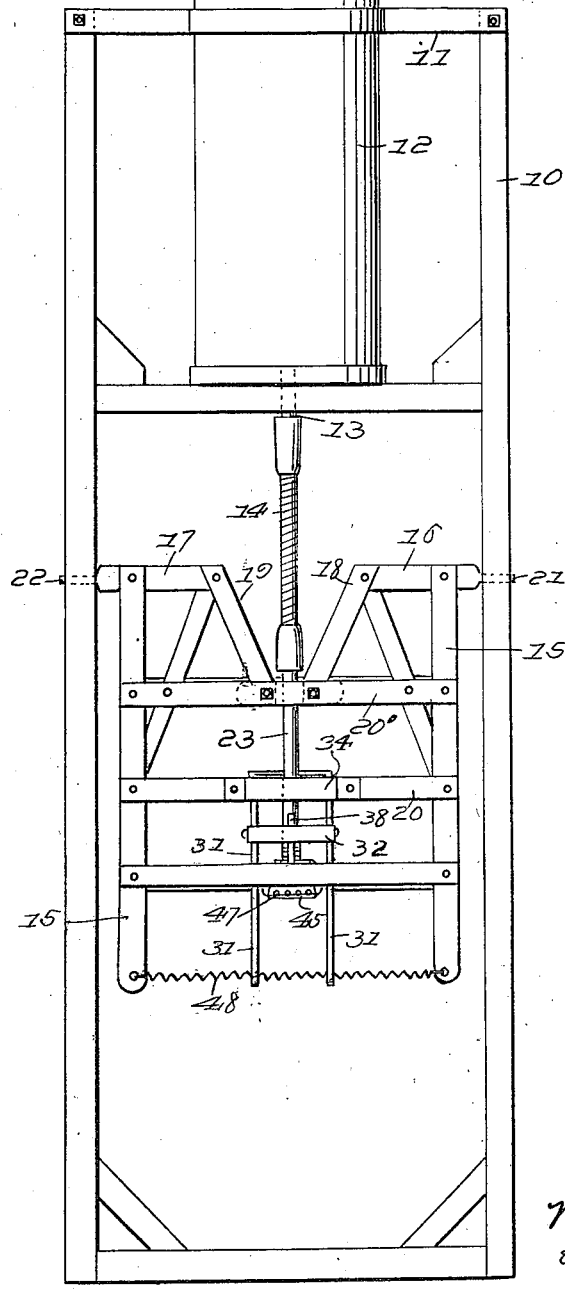
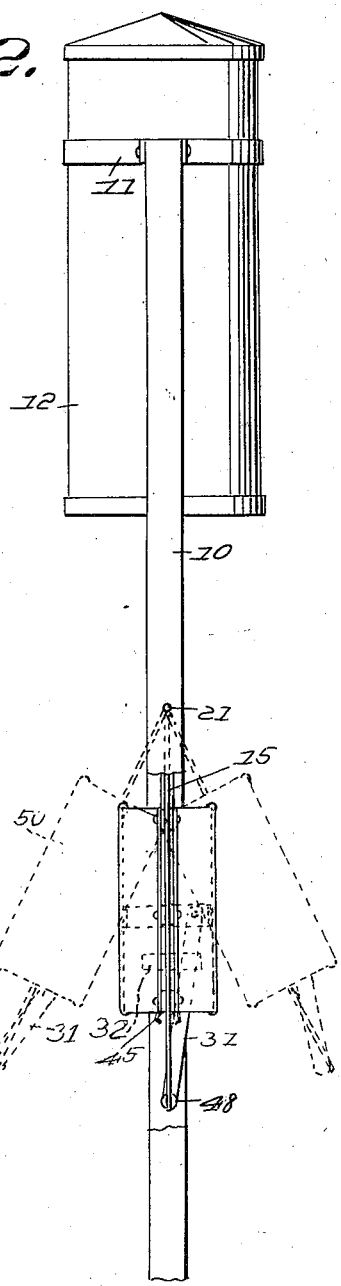

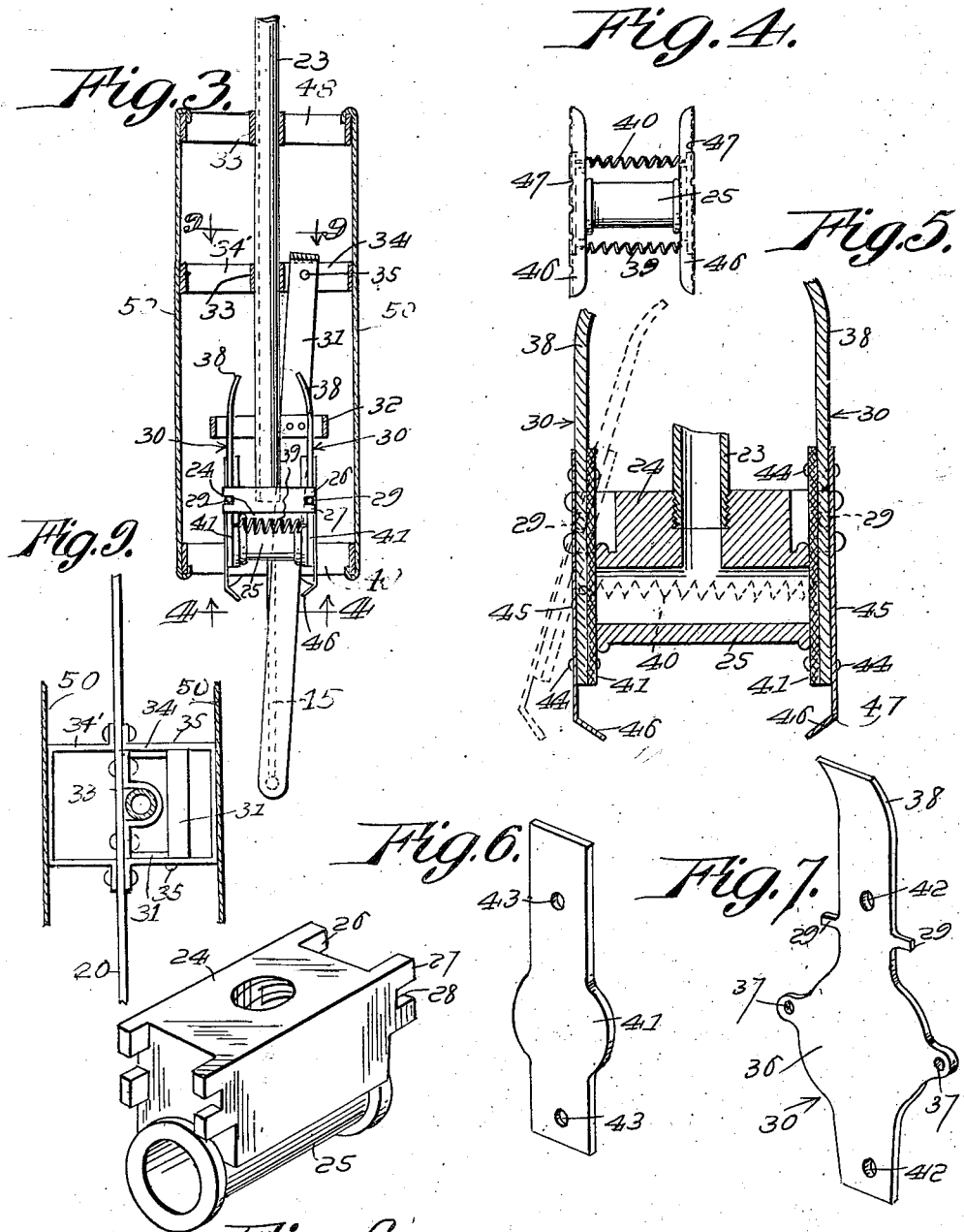

1,429,206

UNITED STATES PATENT OFFICE.

JOHN TRUCKENBRODT AND NIELS C. JENSEN, OF FORT DODGE, IOWA.

DISTRIBUTOR FOR SPRAYING ANIMALS.

Application filed November 8, 1920. Serial No. 422,710.

*To all whom it may concern:*

Be it known that we, JOHN TRUCKENBRODT, and NIELS C. JENSEN, citizens of the United States of America, and residents of Fort Dodge, in the county of Webster and State of Iowa, have invented certain new and useful Improvements in Distributors for Spraying Animals, of which the following is a specification.

This invention relates to distributors for insecticides or disinfectants, the said invention being more particularly intended for spraying hogs or other animals.

An object of this invention is to produce novel means whereby valves may be operated for freeing the insecticide, one of the valves being operated from one side and the other valve being operated from the other side according to the direction of travel of the animal with relation to the distributor.

We have referred to the agencies insecticides and disinfectants in alternative terms, but it is to be understood that this apparatus is intended for different uses and therefore the term "insecticides" will be used hereafter, it being understood that by such term the inventors wish to include any agencies which may be beneficially distributed and automatically applied to the animal traveling in such relation to the device as to actuate the valve controlling mechanism.

A still further object of this invention is to produce a distributor having valves which are mounted to safely confine the insecticide yet having means which are operated with slight pressure for opening or releasing the valves so that the insecticide may be distributed.

A still further object of this invention is to produce a device mounted for oscillatory motion with relation to the frame, the said oscillatory member being in the nature of a gate, the said oscillatory member carrying the operating valves and their actuating mechanisms.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of the front of a distributing apparatus embodying the invention;

Figure 2 illustrates a side elevation thereof a portion of one of the supports being broken away;

Figure 3 illustrates a sectional view of the valve operating device;

Figure 4 illustrates a sectional view on the line 4—4 of Figure 3, parts being omitted;

Figure 5 illustrates a sectional view of the valve structures associated with the discharge pipe;

Figure 6 illustrates a perspective view of a valve facing;

Figure 7 illustrates a perspective view of a valve;

Figure 8 illustrates a perspective view of the distributing pipe and coupling; and Figure 9 illustrates a sectional view taken on line 9—9 of Figure 3.

In these drawings 10 denotes a frame which may be of any appropriate construction and provided with means for holding it upright and the said frame having a support 11 for a tank 12, and the said tank having a nipple 13 to which a flexible tube 14 is connected so that the insecticide may flow from the tank through the said tube.

A swinging member which might be termed a "gate" comprises a frame 15 having a top bar formed in sections 16 and 17 with downwardly extending and converging braces 18 and 19, respectively which are connected to a cross bar 20 which cross bar is attached to the sides 15. The bars 16 and 17 have pintles 21 and 22, respectively which are journaled in the frame so the gate may oscillate. A pipe 23 has its upper end connected to the flexible tube 14 and the lower end is threaded to engage with a head 24 of the distributing pipe 25, the said distributing pipe being open at both ends so that insecticide may escape through either end.

The ends of the head or block 24 have pairs of lugs 26 and 27, one pair being on each side and the lugs of each pair being in spaced relation to each other to form clearances such as 28 for the reception of pintles 29 of the valves 30. The valves are of identical construction and hence a description of one will suffice as a disclosure of both of them.

There is a rectangular open ended loop or frame attached to an intermediate frame 34 which is connected to the gate and to this frame 34 are pivoted the upper portions of the side bars 31 which are rigidly connected between their ends to a yoke or rectangular band 32 which is employed for tripping or opening the valves as will presently appear. The pipe 23 is attached to bars 20 and 20' of the gate by strap loops 33, so as to hold the pipe 25 and the frames 34, 34' in fixed engagement with the gate and the yoke 34 maintains the side bars 31 which are connected thereto by the pivots 35 to provide for oscillatory motion of the yoke or band 32, about the pipe 23 to actuate, when the gate is swung the members 38 which when oscillated opens one of the ends of the discharge head 24. As the head 24 is carried by the pipe, and as the valves are likewise carried by the said head, the relative movement of the parts just described results in operating the valves or one of them according to the direction of oscillation or movement imparted to the device by the animal walking under the gate.

The valves include relatively wide portions 36 having apertured ears 37 at the sides and the pintles 29 heretofore described, and in the present embodiment of the invention, upwardly extending tail pieces 38 which when engaged by the yoke or band 32 cause the valves to swing on their pivots. The valves are held normally closed in engagement with the ends of the distributing pipe 25 by the springs 39 and 40.

The valve facing 41 is of the general contour of the valve and is intended to be of some yieldable material such as leather, the said valve structure and said facing having coinciding apertures 42 and 43, respectively intended to receive fastenings 44 such as rivets by which the facing is attached to the valve.

The outer faces of the valves have plates 45 attached to them, the said plates extending downwardly below the ends of the valves and being provided with inturned flanges 46 which constitute deflectors for the insecticide. There are a number of apertures 47 at the angle of each plate and the flange through which the insecticide may be discharged.

The lower ends of the sides 31 and the lower ends of the gate elements 15 have apertures, and to the last mentioned elements a spring 48 is connected, the said spring extending through the apertures of the sides 31. By this means the parts are held in normal position and are returned to normal position after the animal has passed under the gate. It is the purpose of the inventors to have the relation of parts such that the weight of the gate when it is supported by the animal through the instrumentalities heretofore mentioned, overcomes the tension of the springs which hold the valves seated so that if the animal is walking under the gate in either direction and swings the gate, the valves or one of them will be opened to liberate the insecticide which through the agency of the plate 45 and flange 46, is directed toward the animal so that it will be distributed on him.

The upper clamped on frame 48 which is attached to the pipe 23, the intermediate two part frame 34 and 34' that is attached to a bar 20 of the gate, and the lower frame 49 can be utilized to hold in place a casing or sheathing 50, of suitable configuration and of a sufficient width to encase the valve mechanism, and the same may extend across the gate. The sheathing may have the central portions of its upper and lower edges extended to be bent over the members 48 and 49.

If desirable instead of providing an encasement for the valve operating means, the yoke 34 may be attached to one of the horizontal bars of the gate, as shown by Fig. 9, and when an open ended encasement is used, as shown by Figs. 2, 3 and 9 of the drawings, the same is maintained by frames associated with the central portion of the gate, so that the encasement will surround the valve mechanism, such casing terminating so that its lower open end will be slightly above the inturned ends 46 of the members 45 carried by the oscillatory members 38.

In operation when an animal, for instance a hog, passes under the gate the bars 31 will be moved upon their pivots 35, the yoke 32 attached to the bars will be caused to engage one of the members 38 which will move and hold the same in position to permit discharge of insecticide through one of the now open ends of the head 25, the insecticide or fluid being deflected by contact with the now angularly disposed closure and the bent end portion 46 of the oscillatory member 38, so that the discharge will be in the same general direction as the movement of the animal, and opposite to the lay of the hair of the animal, particularly when spraying swine. It will also be noted that as long as the bars 31 are out of normal position and are so held by the animal that communication with the tank 12 will be established and that when the gate swings to normal position the discharge ports of the head will be closed.

We claim:

1. In a distributor for spraying animals, a gate supporting frame, a gate swingingly associated therewith, a tank, a flexible pipe communicating with the tank, a rigid pipe attached to the gate and connected with the flexible pipe, a head attached to the lower end of the rigid pipe and provided with oppositely extending discharge openings, members pivotally attached to the head, means for holding the lower ends of said members seated to close the discharge openings of the head, bars pivotally associated with the gate below the pivotal points of connection of the gate with its frame, a yoke attached to the bars for engagement with the members attached to head, the parts being associated to effect when the gate is swung the opening of one of the discharge openings which is on the opposite side of the gate from the direction in which it is swung.

2. In a distributor for spraying animals, a frame, a gate swingingly mounted therein, the said gate including side members, sectional top bars, cross bars connecting the side members below the top bars, braces converging from the top bars to one of the cross bars, the said braces terminating near the center of the cross bar and anchored in spaced relation to each other, a tank carried by the frame, a flexible pipe connected with the tank its lower portion being located in the space between the said braces, a pipe rigidly attached to the gate and connected to the said flexible pipe, a distributing head connected to the lower end of the rigid pipe, valves pivotally mounted on the distributing head oscillatory means for controlling the valves of the distributing head, and means for holding the valves normally closed.

3. In a distributor for spraying animals, a frame, a gate swingingly mounted therein, the said gate including side members, sectional top bars, cross bars connecting the side members below the top bars, braces converging from the top bars to one of the cross bars, the said braces terminating near the center of the cross bar and anchored in spaced relation to each other, a pipe located in the space between the said braces, means for supplying fluid to the said pipe, a distributing head to which the pipe is connected, valves pivotally mounted on the distributing head for controlling the distributing pipe and abutments oscillatingly mounted on the gate adapted to contact the valves whereby the valves are opened, means for holding the valves normally closed, and plates carried by the valves, the said plates having inturned flanges with apertures at the junctions of the said plates and flanges.

4. In a distributor for spraying animals, a swinging gate mounted for oscillation between vertical bars of a frame, a tank maintained above the gate by the frame, a tubular flexible connection from the tank, a pipe rigidly attached to the gate, a head attached to the lower end of the pipe attached to the gate said head having oppositely disposed discharge openings, bars pivotally associated with the gate to swing therewith and to have a movement independent thereof, valve actuating means fixedly attached to the swinging bars, valve closing means provided with members which may be engaged by the valve actuating means on the swinging bars operative to unseat one of the valves, and means below the plane of the discharge opening for deflecting the material which issues from the discharge opening.

5. A distributor for spraying animals comprising a frame, a gate suspended between the frame, a tank maintained above the gate, a discharge head associated with the lower portion of the gate and provided with outlets positioned to discharge on either side of the gate, means for connecting the head with the tank, valves carried by the head, said valves having upward extensions means for connecting the valves and holding the same normally in position to close the discharge openings of the head, a bar pivotally attached to the gate below its point of connection with the frame and means carried by the bar for engagement with the extensions of the valves.

6. A distributor for spraying animals comprising a frame, a tank for spraying material, a gate maintained by the frame, a distributing head attached to the gate and provided with valved outlets, means pivotally attached to the gate for unseating the valve of one of the outlets of the distributing head when the gate is moved beyond a vertical position.

7. A distributor for spraying animals, comprising a gate, a distributing head attached to the lower portion of a gate and provided with discharge openings, valves for each of the discharge openings, means pivotally associated with the gate for operating one of the valves, and means associated with the valve for deflecting the material after its discharge.

8. In a distributor for spraying animals comprising a gate, a distributing head attached to the lower portion of the gate and provided with an outlet, a valve associated with the head and provided with an upwardly extending member, valve operating means pivoted to the gate and extending below the distributing head operating to unseat the valve when moved beyond a vertical plane.

9. In a distributor for spraying animals comprising a frame, a tank carried by the frame, a gate maintained to oscillate, a tube having a distributing head at its lower end, a flexible tube which connects the tank with the tube carried by the gate, a distributing head having a discharge opening at right angles to the tube to which it is attached and maintained near the lower portion of the gate, means pivoted to the gate and extending downwardly therefrom beyond the distributing head, a closure for the discharge opening of the distributing head which is maintained in normally closed position and means for unseating the closure when the gate is swung beyond a vertical plane.

JOHN TRUCKENBRODT.
NIELS C. JENSEN.